United States Patent [19]

Nakamura et al.

[11] Patent Number: 5,727,131
[45] Date of Patent: Mar. 10, 1998

[54] NEURAL NETWORK LEARNING DEVICE

[75] Inventors: Joji Nakamura, Kariya; Hiroaki Tanaka, Okazaki; Tomohisa Yoshimi, Gamagori; Takayoshi Kawai, Hoi-gun; Yuji Ito, Ichinomiya; Yuji Takeo, Toyoake, all of Japan

[73] Assignee: Nippondenso Co., Ltd., Kariya, Japan

[21] Appl. No.: 139,710

[22] Filed: Oct. 22, 1993

[30] Foreign Application Priority Data

Oct. 23, 1992 [JP] Japan .................. 4-286265
Nov. 24, 1992 [JP] Japan .................. 4-313602

[51] Int. Cl.$^6$ .............. G06F 15/18; G06E 1/00; G06E 3/00
[52] U.S. Cl. .............. 395/22; 395/20; 395/21; 395/23; 395/24
[58] Field of Search .............. 382/12-15, 155-159; 395/20-27; 165/42; 62/228.4, 179

[56] References Cited

U.S. PATENT DOCUMENTS 5,291,748  3/1994  Ueda .................. 62/179
5,333,240  7/1994  Matsumoto et al. .................. 395/23
5,335,718  8/1994  Smith .................. 165/42
5,372,015 12/1994  Suzuki et al. .................. 62/288.4
5,402,519  3/1995  Inoue et al. .................. 395/22

FOREIGN PATENT DOCUMENTS 3102477  4/1991  Japan .................. G06F 15/62
31777742 8/1991  Japan .................. G24F 11/02

Primary Examiner—Tariq R. Hafiz
Attorney, Agent, or Firm—Cushman, Darby & Cushman IP Group of Pillsbury Madison & Sutro LLP

[57] ABSTRACT

A learning device that affects only the input-output relationships that should be additionally learned. A learning NN unit 8 capable of executing additional learning is provided separately from a learned NN unit 4 which is a basic control unit. The learned NN unit 4 produces a basic output in response to an input signal from a signal input unit 14, the learning NN unit 8 produces a correction amount desired by an individual person, and a desired control is performed based on the total value. When the output is changed, a difference is calculated between the changed output value and the basic output value from a first output unit 15, and the learning NN unit 8 executes the additional learning based upon the difference and the input value at this moment in compliance with a back-propagation method.

12 Claims, 14 Drawing Sheets

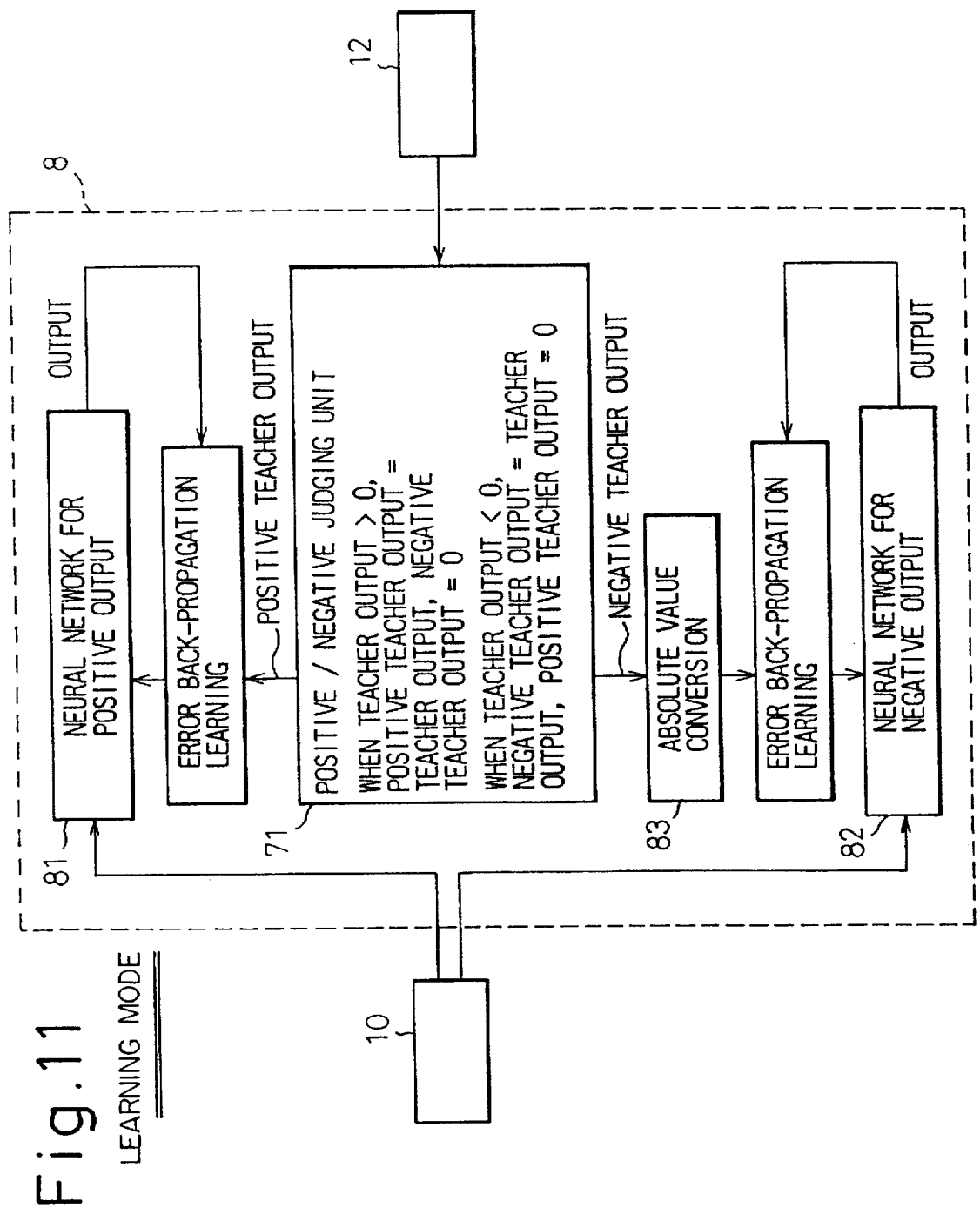
Fig. 11 LEARNING MODE

NEURAL NETWORK LEARNING DEVICE

BACKGROUND OF THE INVENTION

1. Field of the Invention

The present invention relates to a neural network-type learning device which can be effectively used, for example, as a control device that is capable of learning the preferences of individual persons in relation to the blow rate of the air from an air-conditioning device for vehicles.

2. Description of the Related Art

In recent years, a control method capable of learning an individual person's preferences by using a neural network has been adapted to control devices in various fields of applications. According to Japanese Unexamined Patent Publication (Kokai) No. 3-102477, as illustrated in FIG. 3, a neural network 20 has an error back-propagation learning function which inputs data (teacher signals) that indicate whether output signals 1 to n produced in response to input signals 1 to n are correct signals or incorrect signals, and changes the weights of couplings 21 among the neurons 19 in an input layer 1, an intermediate layer 2 and an output layer 3 provided inside a neural net unit 4, and effects repetitive learning in order to enhance the probability for outputting a correct answer when a new signal is input.

The weights of couplings 21 among the neurons 19 are represented as resistances of couplings 21. In a portion where the neurons 19 are coupled together by the coupling 21 of a large weight, a signal from the neuron 19 in the front layer as viewed from the input side has a large amplitude, and flows into a neuron 19 which is coupled to a neighboring position. In a portion where the coupling has a small weight, a signal from the neuron 19 has a small amplitude and flows into a neuron 19 that is coupled to a neighboring position.

Japanese Unexamined Patent Publication (Kokai) No. 3-177742 discloses adapted the above-mentioned neural network to, for example, a device which controls an air-conditioning device. According to this publication, typical control data are learned in advance, and the air-conditioning device is automatically operated by being controlled by the neural net unit (hereinafter referred to as NN unit). When the air-conditioned state does not meet the user's liking, the control data desired by the user are input through an operation unit which is capable of changing the control condition in order to change the control condition. When the control condition is changed, the control device generates new weights for the couplings 21 among the neurons 19 in the NN unit 4 based upon the control data previously learned by the NN unit 4 and the additional data that indicate the changed condition. Subsequently, the air-conditioning unit is automatically controlled by the NN unit 4 having new weights so that the air-conditioned state will meet the liking of an individual person.

According to the learning method disclosed in the above Japanese Unexamined Patent Publication (Kokai) No. 3-177742, however, when the control condition is changed, the device learns not only the new input-output relationships but also the control data that have been already learned. Therefore, the device obtains not only the new input-output relationships that should be learned but also the desired outputs of the initially controlled condition. By doing so, the device effects even those portions where the input-output relationships should not be changed, causing even the basically controlled state not to be in the desired condition.

SUMMARY OF THE INVENTION

The object of the present invention therefore is to provide learning device that affects only the input-output relationships that should be additionally learned.

In order to accomplish the above-mentioned object according to a basic aspect of the present invention, there is provided a neural net-type learning device which comprises a signal input means which inputs signals, a basic control unit which has already learned a basic control pattern consisting of signals input from the signal input means and output signals that should be output in response to the input signals, and outputs basic output values based on the basic control pattern when input signals are input from the input means, a learning neural net unit which outputs additional output values based on an additional control pattern when input signals are input from the signal input means, a total output unit which outputs total output values based on the sum of the basic output values output from the basic control unit and the additional output values output from the learning neural net unit, an output changing means which changes the total output values of the total output unit into any output values, a storage unit which, when the total output values are changed by the output changing means, stores the basic output values output from the basic control unit, the input signals input from the signal input means, and the output values changed by the output changing means, and a difference calculation means which calculates differences between the basic output values stored in the storage unit and the output values changed by the output changing means, and further in the device, the storage unit stores additionally learned data which consist of the differences calculated by the difference calculation means and the input signals, and the learning neural net unit executes the learning of the additional control pattern based upon the additionally learned data stored in the storage unit.

According to a second aspect of the present invention, there is further provided a neural net-type learning device of the basic aspect which further comprises, a comparator means which compares a region of the storage unit capable of storing the amount of the additionally learned data that are stored when the total output values are changed by the output changing means, a selection means which selects additionally learned data that represent more unnecessary output values out of the additionally learned data stored in the storage unit when it is judged by the comparator means that the amount of the additionally learned data stored in the storage unit has exceeded the capacity of the storage region, a judging means which compares the unnecessary additionally learned data selected by the selection means with new additionally learned data of when the total output values are changed, and judges which additionally learned data represent more important output values, and a stored data control means which does not store the new additionally learned data when it is judged by the judging means that the additionally learned data stored in the storage unit represent more important output values, and writes the new additionally learned data over the unnecessary additionally learned data stored in the storage means and selected by the selection means and stores them when it is judged by the judging means that the new additionally learned data represent more important output values.

According to a third aspect of the present invention, furthermore, there is provided a neural net-type learning device of the basic aspect which comprises a judging means which judges whether the differences in the outputs calculated by the difference calculation means have positive values or negative values and an absolute value conversion means which converts the differences in the outputs into absolute values when the differences in the outputs are judged by the judging means to have negative values, and in the device, the learning neural net unit further comprises a neural net unit for positive output which, when input signals are input from the signal input means, outputs additional output values of the positive side based on an additional control pattern of the positive side, a neural net unit for negative output which, when input signals are input from the signal input means, outputs additional output values of the negative side based on an additional control pattern of the negative side, an output conversion means which multiplies by −1 the additional output values of the negative side output from the neural net unit for negative output, and an output unit which outputs the sums of the additional output values of the positive side and the additional output values of the negative side multiplied by −1 by the output conversion means.

In this aspect, the neural net unit for positive output executes the learning of said additional control pattern of the positive side based upon the differences in the outputs and the input signals of when the outputs are changed, when the differences in the outputs calculated by the difference calculation means have positive values and the neural net unit for negative output executes the learning of the additional control pattern of the negative side based on the differences in the outputs that are converted into absolute values by the absolute value conversion means and the input signals when the outputs are changed, when the differences in the outputs calculated by the difference calculation means have negative values.

According to the neural net-type learning device constituted according to the basic aspect of the present invention, a learning neural net unit capable of learning is provided separately from the basic control unit that executes the basic control operation. A difference between the basic output value and the output value after a change is calculated when a total output value is changed by the output changing means, the output value being the sum of the output of the basic control unit and the output of the learning neural net unit. The storage unit stores, as additionally learned data, the previous difference and the input signal that is sent from the signal input means when the output value is changed.

The difference at the time of change is learned by the learning neural net unit in response to the input signal, so that the learning neural net unit outputs a change in the output of the basic control unit corresponding to the input signal stored in the storage unit. That is the learning neural net unit outputs the difference between the basic output value and the output value after the change. By using a learning neural net unit to output a difference resulting from a change in the control condition, the basic control unit that executes the basic control operation does not have to be re-obtained for every change. Rather, the additionally learned data corresponding to the change only are learned by the learning neural net unit. Since only the additional data corresponding to the changed condition is learned, the control pattern in compliance with the additional data is also learned, and thereby an additional output signal is added to the basic output signal to obtain a desired output value.

According to the second aspect of the present invention, furthermore, the region in the storage unit capable of being stored into is compared with the amount of the additionally learned data that are stored when the output is changed by the output changing means in order to judge if the data have been stored up to the full capacity of the storage region. When the additionally learned data are stored up to the full capacity and when the additionally learned data that are selected represent unnecessary output values selected from the storage unit, it is judged which data are more important between the selected additionally learned data and the new additionally learned data, and the additionally learned data that are more important are stored. When it is judged that the new additionally learned data represent output values which are more important than those of the additionally learned data that have been stored, the new additionally learned data are written over the additionally learned data that were compared and stored. The new additionally learned data are not stored when it is judged that the additionally learned data that have been previously stored give output values which are more important than those of the new additionally learned data, even when the previously stored data are regarded as unnecessary.

According to the third aspect of the present invention, the learning neural net unit is equipped with the neural net unit for positive output and the neural net unit for negative output. The additionally learned data that are judged by the judging means to have positive output values relative to the input signals are learned by the neural net unit for positive output as an additional control pattern of the positive side. On the other, the negative additionally learned data that are judged to have negative output values relative to the input signals are converted into absolute output values of a positive sign through the absolute value conversion means and are learned by the neural net unit for negative output as an additional control pattern of the negative side.

In response to an input signal, the neural net unit for positive output produces an additional output value of the positive side and the neural net unit for negative output produces an additional output value of the negative side. The additional output value of the negative side has been learned by the neural net portion for negative output as a positive output value. Therefore, the additional output value of the negative side is multiplied by −1 through the output changing means to obtain a negative value. The output unit outputs the sum of the output value of the negative side multiplied by −1 and the output value output from the neural net unit for positive output. The output value is produced as an output value of the learning neural net unit.

BRIEF DESCRIPTION OF THE DRAWINGS

FIG. 11 is a system diagram of the learning NN unit in the learning mode;

DETAILED DESCRIPTION OF THE PREFERRED EMBODIMENTS

An embodiment of the learning device of the present invention will now be described with reference to the drawings.

Figure 1:
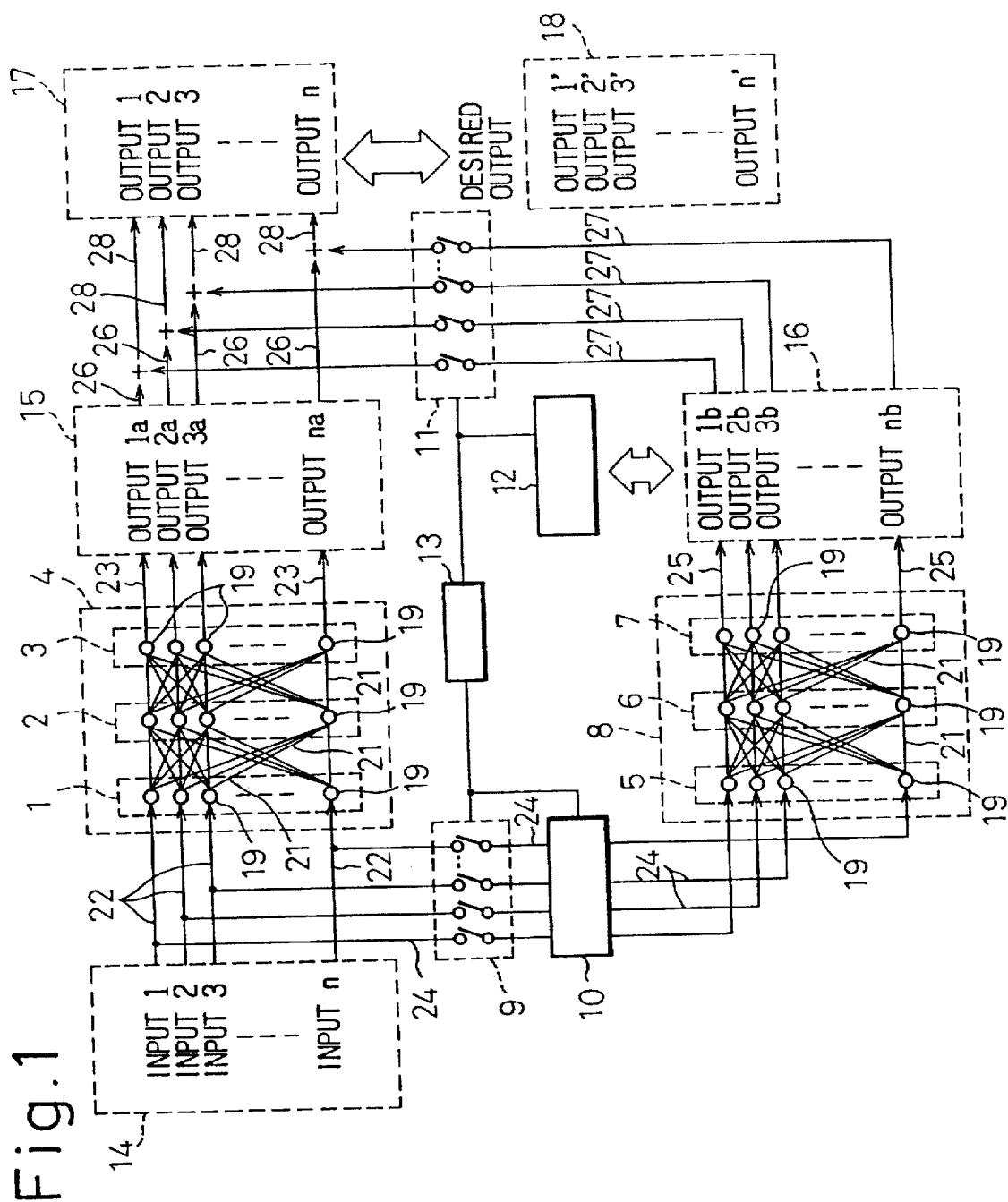
FIG. 1 is a system diagram illustrating a neural net-type learning device according to a first embodiment of the present invention.

As shown in FIG. 1 which is a system diagram, the learning device comprises chiefly a signal input unit 14, a trained neural net unit 4 (hereinafter referred to as a trained NN unit), learning neural net unit 8 (hereinafter referred to as learning NN unit), a first output unit 15, a second output unit 16, a total output unit 17, a first memory 10, a second memory 12, and a control unit 13.

The signal input unit 14 sends a desired number of signals to the trained NN unit 4 and to the learning NN unit 8.

The trained NN unit 4 is constituted by an input layer 1 that receives input signals propagated from the signal unit 14 through leads 22, an intermediate layer 2 that receives signals from the input layer 1, and an output layer 3 that receives signals from the intermediate layer 2. A plurality of neurons 19 that receive signals are arranged in each of the layers 1, 2 and 3, and the number of the neurons 19 of the input layer 1 is the same as the number of the signals sent from the signal input unit 14. The intermediate layer 2 and the output layer 3 may have any number of neurons 19. The neurons 19 in the layers 1, 2 and 3 are electrically coupled together through couplings 21, and the weight of electrical propagation differs depending upon the individual couplings 21. Though FIG. 1 shows the intermediate layer 2 of one layer only, it may be made up of a plurality of layers.

Like trained NN unit 4, learning NN unit 8 is constituted by an input layer 5 which receives input signals that are propagated from the signal input unit 14 through leads 24 via the first memory 10, an intermediate layer 6, and an output layer 7. The neurons 19 are arranged in a plurality of numbers in the layers 5, 6 and 7, and the number of neurons 19 of the input layer 5 is the same as the number of the signals sent from the signal input unit 14. The intermediate layer 6 may have any number of neurons 19, and the number of neurons 19 of the output layer 7 is the same as the number of neurons 19 of the output layer 3 in the trained NN unit 4. The neurons 19 in the layers 5, 6 and 7 are electrically coupled together through couplings 21, and the weight differs depending upon the individual couplings 21. The intermediate layer 2 may be constituted by a plurality of layers instead of one layer.

The first output unit 15 is coupled to the neurons 19 of the output layer 3 in the trained NN unit 4 through electrically coupled leads 23, and it produces the signals of neurons 19 of the output layer 3 as output signals 1a to na.

The second output unit 16 is coupled to the neurons 19 of the output layer 7 in the learning NN unit 8 through leads 23, it produces the signals of neurons 19 of the output layer 7 as output signals 1b to nb.

The total output unit 17 outputs the sum of an output signal 1a from the first output unit 15 and an output signal 1b from the second output unit 16 as a total output value 1, and similarly outputs to the external unit the sum of an output 2a and an output 2b through up to the sum of an output na and an output nb as total output values 1 to n.

When the total output values 1 to n produced by the total output unit 17 are changed to desired output values 1' to n', the control unit 13 successively calculates a difference between a desired output value 1' and an output signal 1a of the first output unit 15 through up to a difference between a desired output value n' and an output signal na of the first output unit 15. When the learning NN unit 8 is being trained, a switch 9 connecting the leads 24 and a switch 11 connecting the leads 27 are rendered nonconductive. When not being trained, these switches are rendered conductive.

When the total output values produced by the total output unit 17 are changed, the first memory 10 stores the input signals 1 to n sent from the signal input unit 14.

When the total output values produced by the total output unit 17 are changed, the second memory 12 stores differences between the desired output values 1' to n' calculated by the control unit 13 and the output signals 1a to na produced from the first output unit 15.

In the above constitution, the trained NN unit 4 is the one that has learned a standard input-output pattern in advance relying upon a widely known back-propagation method.

Next, described below is the operation of the learning device of the present invention.

The trained NN unit 4 produces outputs 1a to na that correspond to the input data. These outputs are produced as a result of having the standard pattern trained by the learned NN unit 4. In the initial stage, the learning NN unit 8 is not learning new data, and the outputs 1b to nb are zeros. Therefore, the outputs 1 to n obtained by adding outputs 1a to na and outputs 1b to nb together, are equal to the outputs 1a to na of the trained NN unit 4.

Described below are the processes of when outputs 1' to n' are required as desired outputs for the outputs 1 to n.

When the outputs 1 to n produced by the total output unit 17 are changed to desired outputs 1' to n', the learning NN unit 8 must be trained to produce differences between the outputs 1a to na of the first output unit 15 and the desired outputs 1' to n'. For this purpose, the input data are stored in the first memory 10 with the switch 9 being rendered conductive, and the differences between the outputs 1' to n' and the outputs 1a to na are stored in the second memory 12. Thereafter, the switches 9 and 11 are rendered nonconductive, and the learning NN unit 8 is trained on the data stored in the first and second memories 10 and 12 as training data relying upon the conventional back-propagation method. Here, the training is effected so that the outputs 1b to nb are zero for the input data other than those of the region where the characteristics are to be changed and to which the input data for producing outputs 1b to nb of differences for obtaining desired outputs 1' to n' pertain.

When the learning NN unit 8 is trained, the control unit 13 renders the switch 9 conductive, so that the inputs 1 to n are fed to the learning NN unit 8. As the control unit 13 renders the switch 11 conductive to let the input signals be fed, the second output unit 16 produces outputs 1b to nb. The outputs 1b to nb are produced from the second output unit 16 and are added to the outputs 1a to na produced from the first output unit 15, and thereby the desired outputs 1' to n' are obtained as outputs 1 to n.

When the outputs 1 to n are changed to the desired outputs 1' to n', the learning NN unit 8 repeats the learning to obtain desired outputs for any input data.

The first memory 10 and the second memory 12 must have adequate capacities to store the amount of the training data. Therefore, effective input-output characteristics must be obtained with limited memory capacities by deleting old data and deleting the sets of input data and output data that produce output values which are relatively close to the output values of the input-output pattern that has been stored in advance in the trained NN unit 4.

With the above constitution, the standard input-output relationship is dealt with by the trained NN unit 4, and the learning NN unit 8 produces the corrected outputs. If there is no learning NN unit 8, additional learning is effected by having a desired input-output relationship learned by the NN unit in addition to having the standard input-output relationship learned. Usually, the amount of correction is smaller than the standard output amount. Provision of the learning NN unit 8, therefore, makes it possible to improve the precision of correction amount enabling the precision of desired outputs to be improved. Even in a case where the result of additional learning does not converge within a predetermined amount of error, the basic input-output relationship is guaranteed by the trained neural net 4.

Figure 2:
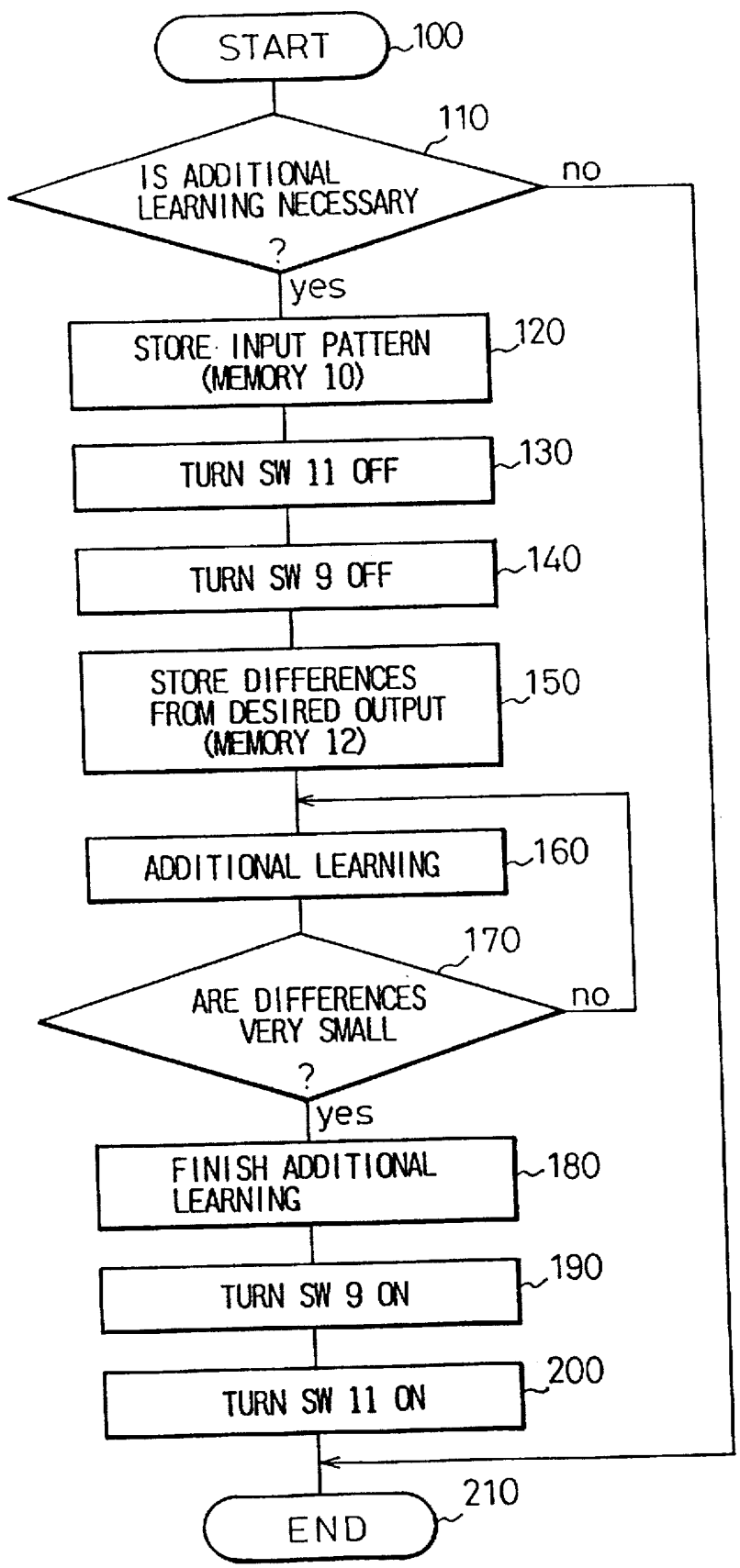
FIG. 2 is a flowchart illustrating the operation for controlling the neural net-type learning device of the present invention.
Figure 3:
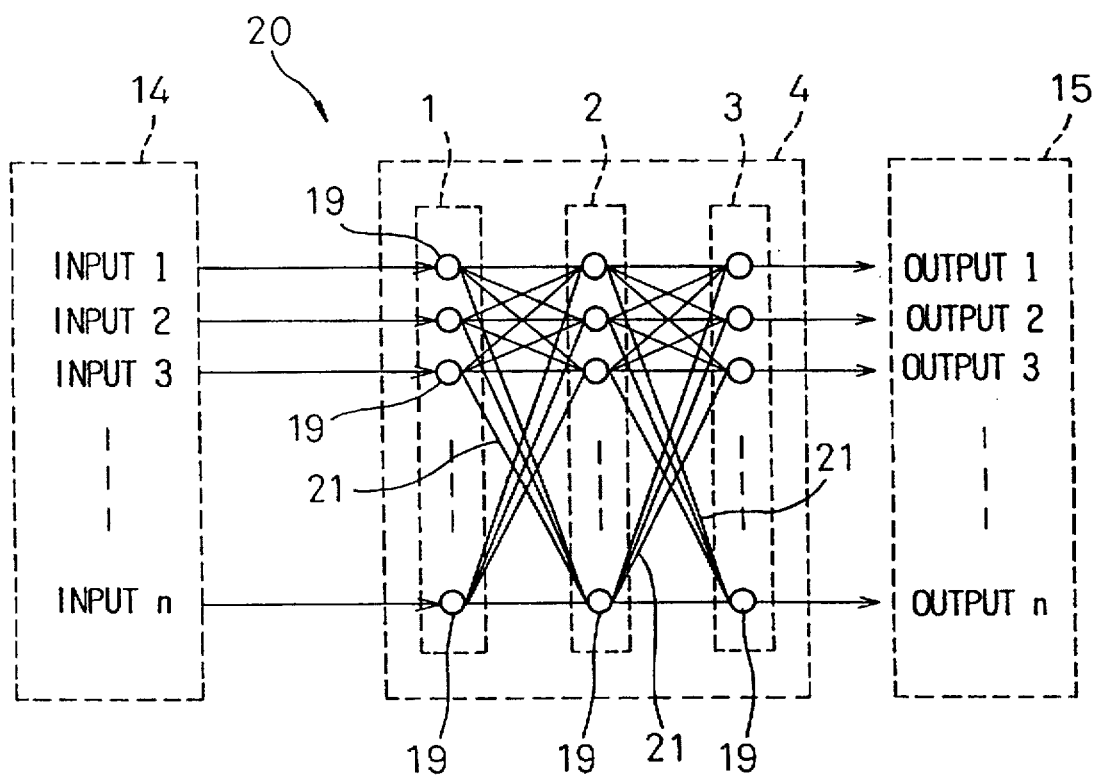
FIG. 3 is a system diagram illustrating a conventional neural net-type learning device.

Next, the operation of the control unit 13 is described below in conjunction with a flowchart of FIG. 2.

The control operation is started at a step 100, and a step 110 judges whether additional learning is necessary or not. When the desired outputs 1' to n' are different from the outputs 1 to n and it is judged that additional learning is necessary, the input data 1 to n are stored in the first memory 10 at a next step 120. Then, a step 130 and a step 140 render the switch 11 and the switch 9 nonconductive, and, at a step 150, the differences between the desired outputs 1' to n' and the outputs 1a to na from the first output unit 15 are stored in the second memory 12. At a next step 160, a relationship between the input data and the desired outputs is learned relying upon the back-propagation method with the differences as teacher signals. Furthermore, the learning is so effected that the outputs are zero for the input data other than those data that are newly stored in the memory 12 as teacher signals. When it is judged at a step 170 that the differences are small between the output values of input-output data and the learned output values that are stored in the memories 10 and 12 and when the additional learning is finished at a step 180, then the switches 9 and 11 are rendered conductive at steps 190 and 200, and the control operation is finished. Then, the outputs of the learning NN unit 8 are added to the outputs of the trained NN unit 4, and the additionally learned input-output relationship is reflected on the output.

Though the above-mentioned embodiment has employed the trained NN unit 4, the input-output relationship of this portion is not changed by learning. Therefore, this unit may be made up of an electronic circuit inclusive of a micro computer. It is in no way limited to the neural net.

The learning NN unit 8 needs not be limited to only one unit but multiple units may exist. When there are, for example, two learning NN units 2, the outputs of one additionally learning NN can be added to the outputs of the trained NN unit 4 to obtain final outputs while the other learning NN unit is learning. When additional learning is finished, therefore, the outputs of the learning NN unit that has finished the additional learning and the outputs of the trained NN unit can be added together to obtain final outputs. Additional learning can be effected by alternatingly changing the two learning NN units, and the learned results can be reflected on the outputs at all times. Here, the constitutions may be made up of either hardware or software.

In the above embodiment, when the total output values 1 to n are changed, the differences are found between the desired output values 1' to n' and the outputs 1a to na of the trained NN unit 4, and are used as teacher data to learn, e.g., the preferences of an individual person.

It is, however, also allowable to calculate the differences between the desired output values 1' to n' and the total output values 1 to n when the total output values 1 to n are changed, and to add the output values 1b to nb of the learning NN unit 8 corresponding to the input signals and the calculated differences in the outputs, in order to obtain teacher data that represents the preferences of an individual person.

According to the conventional constitution, the learning must be effected from the beginning inclusive of the learned pattern. By providing the learning NN unit 8 separately from the trained NN unit 4 and by effecting additional learning by the learning NN unit 8 only, the amount of data to be learned decreases greatly and the learning time shortens.

Described below in conjunction with the drawings is a second embodiment of the present invention in which the neural net-type learning device is used for controlling the blow rate of the air from an air-conditioning device for vehicles.

Figure 4:
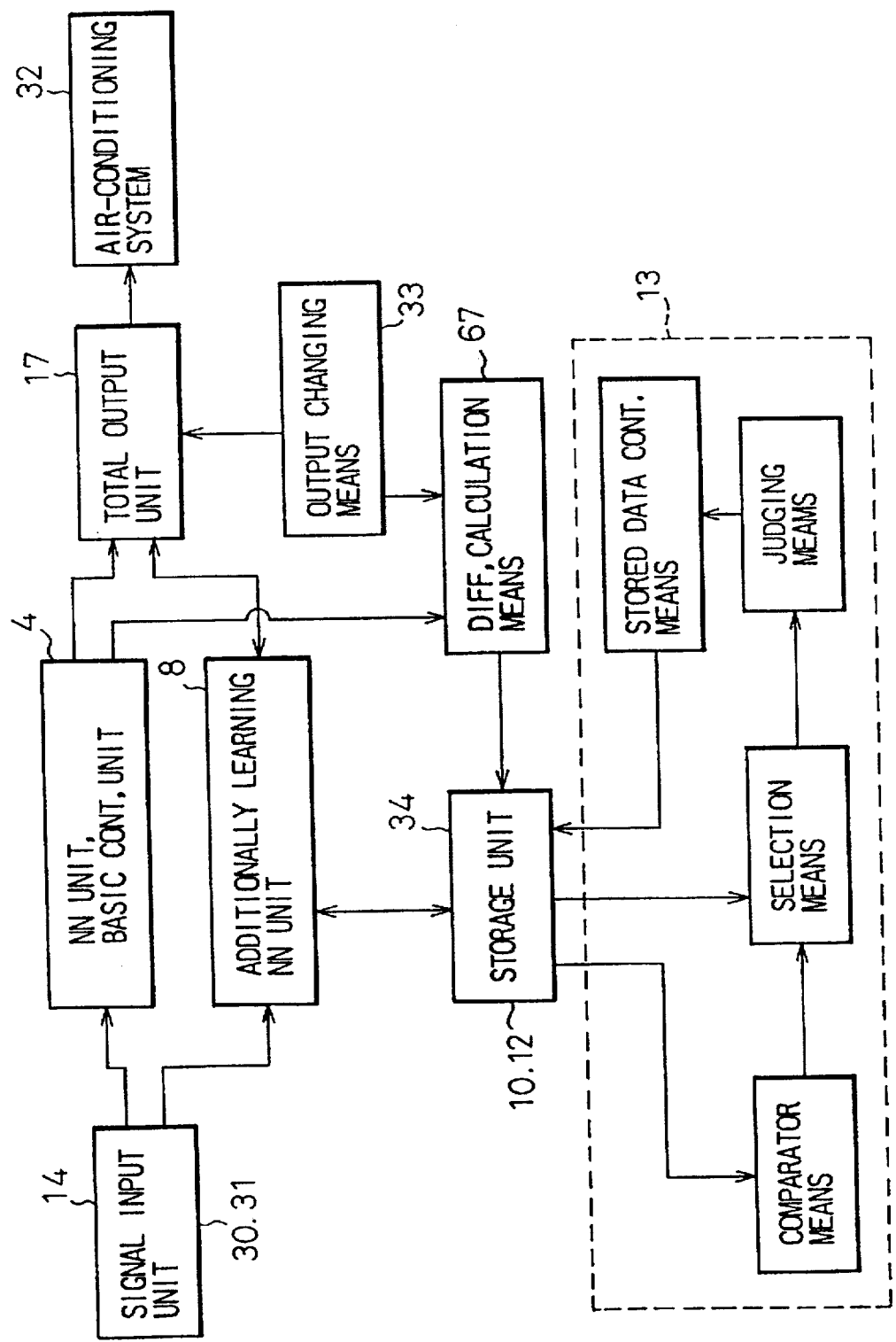
FIG. 4 is a system diagram illustrating a second embodiment of the present invention.
Figure 5:
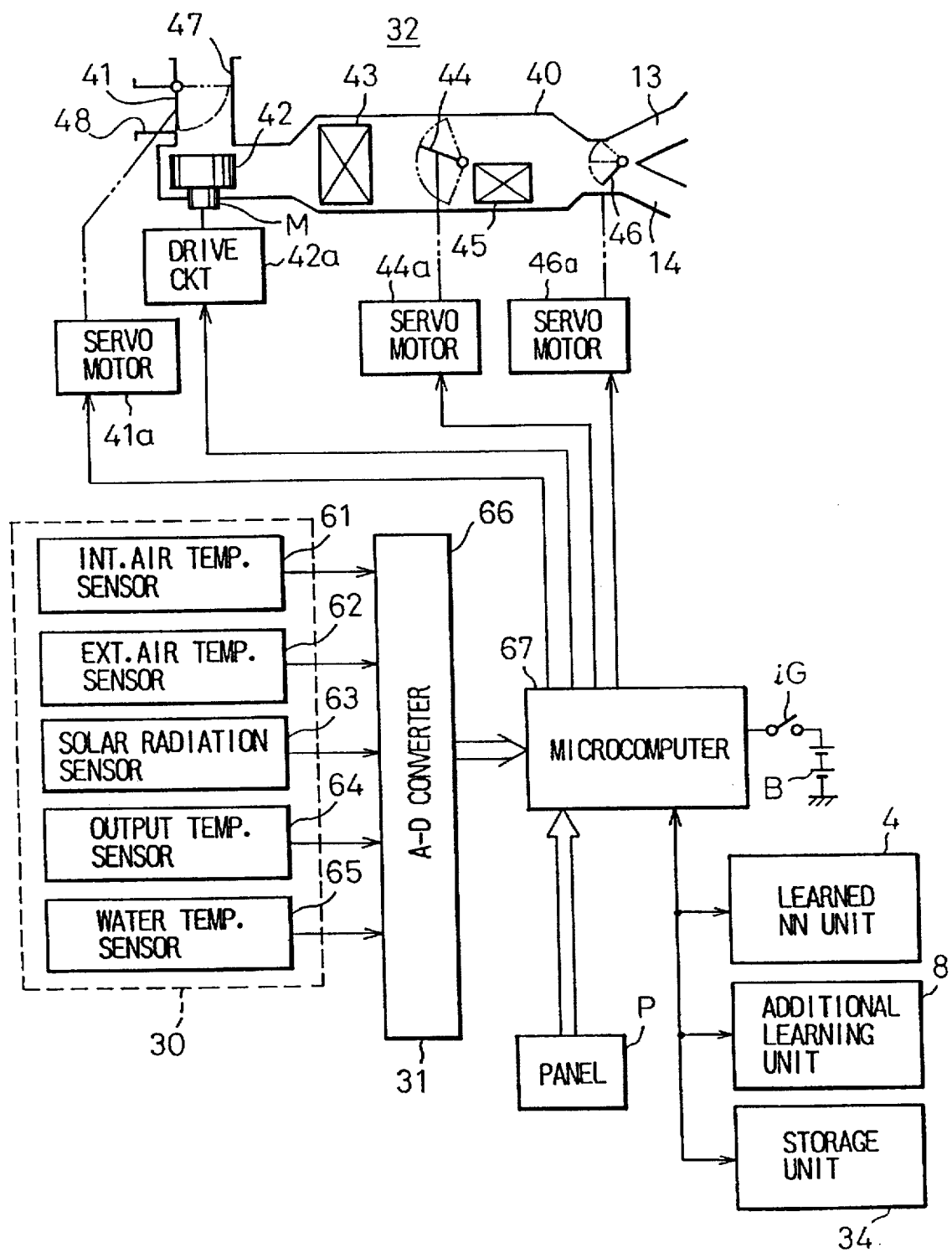
FIG. 5 is a diagram illustrating the neural net-type additionally learning device of the present invention when used for an air-conditioning device.

FIG. 4 is a system diagram of an air conditioner control mechanism illustrating the constitution of the present invention and FIG. 5 illustrates an air-conditioning device.

A signal input unit 14 shown in FIG. 4 corresponds to a group 30 of environment sensors such as temperature sensors (and the like) of FIG. 5 that detect the conditions of an environment where the air is to be conditioned, and send the detected results to an A-D converter 66 which is a sensor processing unit 31.

The sensor processing unit 31 collects the output signals from the group 30 of environment sensors at predetermined time periods, and sends them to the trained NN unit 4 and to learning NN unit 8.

The trained NN unit 4 which is a basic control unit performs the basic control operation for air conditioning in the same manner as in the first embodiment, and is constituted by a neural net (and the like) that has learned in advance, as teacher signals, the environmental conditions from the group 30 of environment sensors and basic control characteristics of an air-conditioning device 32 under the above environmental conditions. The trained NN unit 4 sends the basic control signals for basically controlling the air-conditioning device 32 to the total output unit 17 in response to input signals from the group 30 of environment sensors.

Reference numeral 33 denotes an operation unit which is an output changing means that can be set so as to change the air-conditioning control state of the learned NN unit 4 depending upon the preferences of a user. The amount of change in the outputs of the operation unit 33 is sent as desired control data to the memory 12.

The learning NN unit 8 sends the control data desired by the operator to the total output unit 17. When desired control data is input from the operation unit 33 which is the output changing means, the learning NN unit 8 stores the following in a storage unit 34: a variety of environment sensor data from the sensor processing unit 31, basic output values from the basic control unit 4, and output values changed by the operation unit 33. A microcomputer 67 which is a difference calculation means calculates differences between the basic output values and the output values changed by the operation unit 33, and additional learning data consisting of these differences and the environment sensor data are stored. Learning based on the additionally learned data makes it possible to output control data as desired by the operator.

The memory unit 34 corresponds to the memories 10, 12 in the first embodiment, and stores the environment data from the sensor processing unit 31 and the differential control data between the outputs of the basic control unit 4 and the outputs of the operation unit 33 as addition data is learned by the learning NN unit 8. Here, however, the memory unit 34 checks the storage region and the amount of data learned, and retrieves the learned data closest to the basic control data from all the learned data when it is judged that the amount of data learned is greater than the storage region. It also compares the data with the learned data that are input at this time, and stores those data that have larger differences.

The total output unit 17 effects the addition or subtraction for the basic control data from the trained NN unit 4 and for the desired control data from the learning NN unit 8 to prepare automatic control data, and controls the air-conditioning device 32.

FIG. 5 illustrates an air-conditioning device controller for vehicles according to the present invention. The air-conditioning device controller has an air duct 40 mounted on the vehicle. Inside the air duct 40 are arranged, from the upstream side toward the downstream side thereof, an internal air/external air switching damper 41, a blower 42, an evaporator 43, an air-mixing damper 44, a heater core 45 and a blow port switching damper 46. The internal air/external air switching damper 41 is switched by a servo motor 41a to an external air introduction position (indicated by a solid line in FIG. 5) so that the external air is introduced into the air duct 40 through an external air introduction port 47, and is further switched to an internal air introduction position (indicated by a dot-dash chain line in FIG. 5) so that the air in the room of the vehicle is introduced into the air duct 40 through an internal air introduction port 48.

The blower 42 introduces the external air from the external air introduction port 47 or the internal air from the internal air introduction port 48 via the internal air/external air switching damper 41 depending upon the speed of revolution of the blower motor M driven by a drive circuit 42a, and sends the air as an air stream to the evaporator 43 which cools the air stream from the blower 42 depending on the cooling cycle of the air-conditioning device controller. The air-mixing damper 44 is driven by a servo motor 44a. It permits, depending upon the opening degree thereof, the cooled air stream from the evaporator 43 to flow into the heater core 45 and the remainder of the cooled air stream to flow directly toward the blow port switching damper 46. The heater core 45 heats the cooled air stream introduced therein depending upon the temperature of the cooling water from the engine-cooling system of the vehicle, and lets the heated air stream flow toward the blow port switching damper 46.

Being driven by the servo motor 46a, the blow port switching damper 46 is switched to a first switched position (indicated by a solid line in FIG. 5) during the ventilation mode (VENT) of the air-conditioning device controller, and permits the air stream to be blown to the center of the vehicle passenger compartment from a vent blow port 13 of the air duct 40. Being driven by the servo motor 46a, furthermore, the blow port switching damper 46 is switched to a second switched position (indicated by a dot-dash chain line in FIG. 5) during the heating mode (HEAT) of the air-conditioning device controller, and permits the air stream to be blown to the lower portion of the passenger compartment from a foot blow port 14 of the air duct 40. Being driven by the servo motor 46a, moreover, the blow port switching damper 46 is switched to a third switched position (indicated by a two-dot chain line in FIG. 5) during the high-level mode (B/L) of the air-conditioner controller, and permits the air stream to be blown to the center and the lower part of the passenger compartment from the two blow ports 13 and 14.

Figure 6:
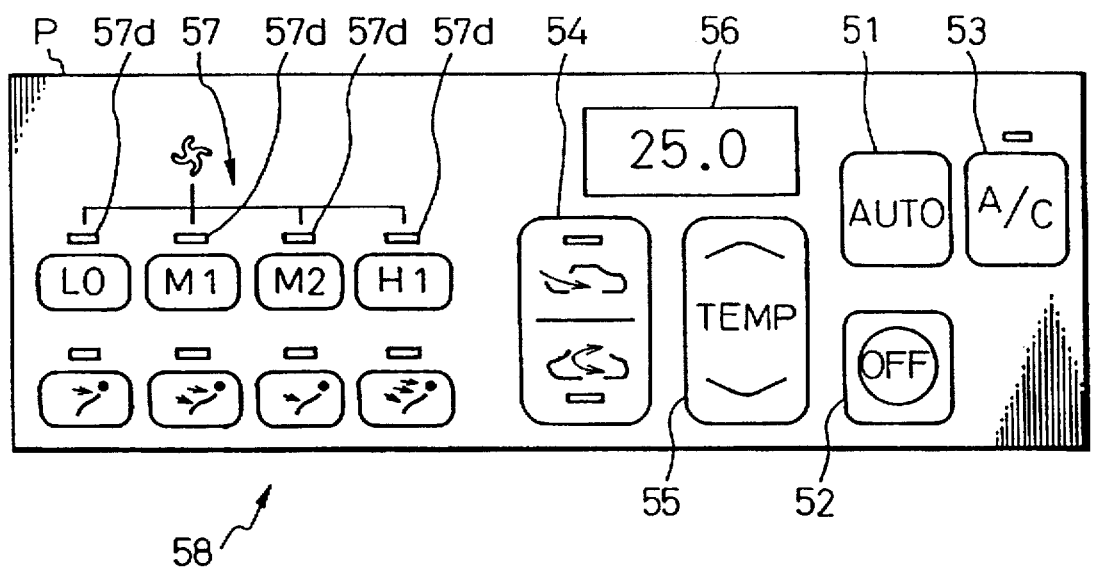
FIG. 6 is a front view illustrating a panel P.

The operation panel P is provided in an instrument panel in front of the driver's seat in the passenger compartment and is equipped, as shown in FIG. 6, with multiple switches described in the following: An auto switch 51 sets an automatic mode that automatically controls the above-mentioned portions in compliance with a predetermined control pattern. A turn-off switch 52 inputs an operation stop instruction to the air-conditioning device controller, i.e., for de-energizing the drive circuit 42a that drives the blower 42. An air conditioner switch 53 switches the operation and stop of cooling cycle, i.e., changes the operation and stop of the compressor (not shown). An internal air/external air switch 55 switches into circulation of the internal air or introduction of the external air. A temperature setting switch 55 sets a desired temperature in the passenger compartment. A display 56 displays a desired temperature in the passenger compartment set by the temperature setting switch 55. A blow rate setting switch 57 sets the amount of air stream from the blower 42 to a strong level, an intermediate level or a low level. A blow port setting switch 58 sets the blow port, and similar switches.

An internal air temperature sensor 61 detects the real temperature in the passenger compartment and generates an internal air temperature detect signal. An external air temperature sensor 62 detects the real temperature of the air outside the vehicle and generates an external air temperature detect signal. A solar radiation sensor 63 detects the real amount of solar radiation incident in the passenger compartment and generates a solar radiation detect signal. An outlet temperature sensor 64 detects the real temperature at the outlet port of the evaporator 43 and generates an outlet temperature detect signal. A water temperature sensor 65 detects the real temperature of the cooling water in the engine cooling system of the vehicle and generates a water temperature detect signal.

An A–D converter 66 converts the internal air temperature detect signal from the internal air temperature sensor 61, the external air temperature detect signal from the external air temperature sensor 62, the solar radiation detect signal from the solar radiation sensor 63, the outlet temperature detect signal from the outlet temperature sensor 64, and the water temperature detect signal from the water temperature sensor 65 into digital signals that represent the internal air temperature $T_R$, external air temperature $T_{AM}$, amount of solar radiation Ts, outlet temperature Te and water temperature Tw.

Figure 7:
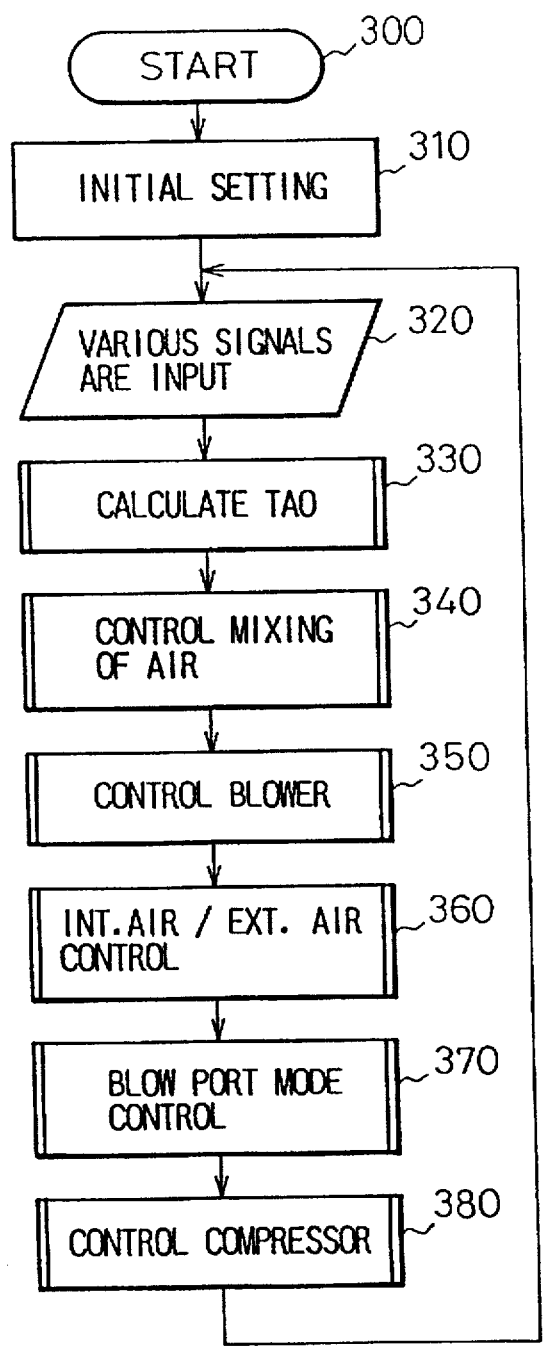
FIG. 7 is a flowchart illustrating the control operation according to the second embodiment of the present invention.
Figure 8:
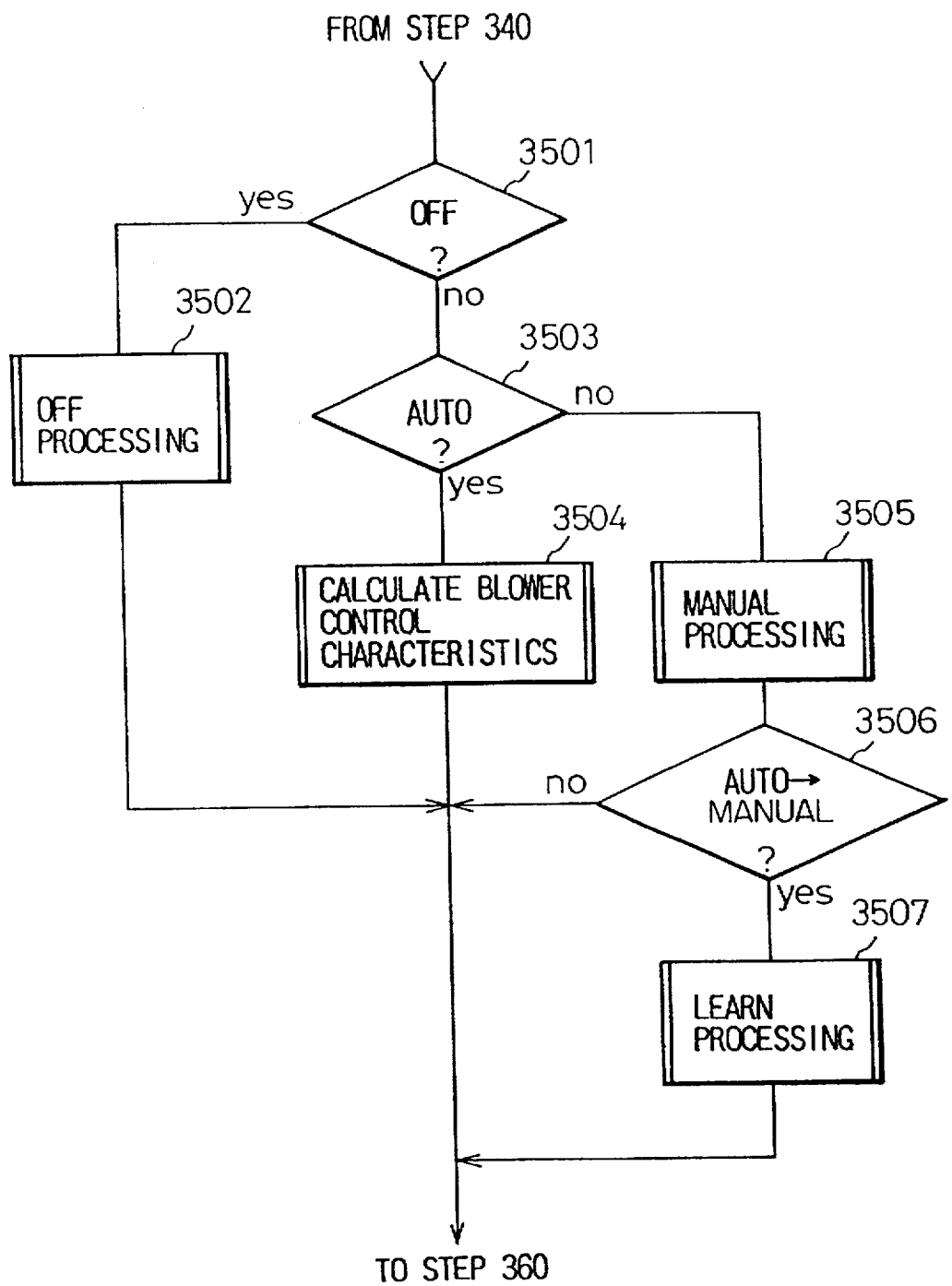
FIG. 8 is a flowchart illustrating the control operation according to the second embodiment of the present invention.
Figure 9:
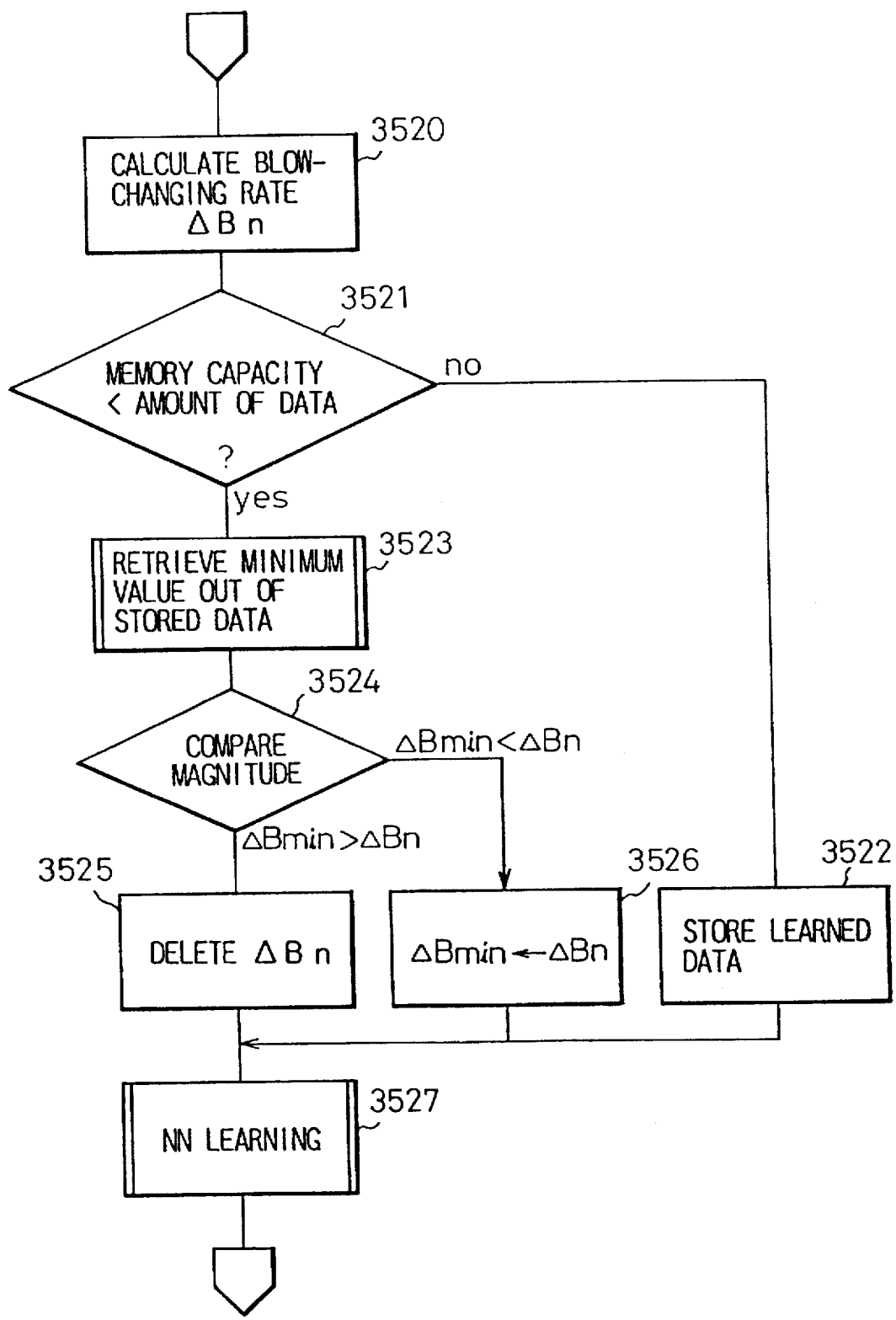
FIG. 9 is a flowchart illustrating the control operation according to the second embodiment of the present invention.

A microcomputer 67 executes arithmetic processing necessary for driving and controlling the drive circuit 42a and the servo motors 41a, 44a and 46a in compliance with flowcharts of FIGS. 7 to 9.

However, the above-mentioned computer program is stored in advance in the ROM of the microcomputer 67.

The microcomputer 67 starts operating being supplied with electric power from a battery B via an ignition switch iG of the vehicle.

To the microcomputer 67 are connected the trained NN unit 4, the learning NN unit 8 and the storage unit 34. The air-conditioning device is controlled by the trained NN unit 4 and the learning NN unit 8, and the storage unit 34 stores a control pattern that should be additionally learned.

This embodiment is the same as the first embodiment except that the values of the environment sensors 61 to 65 are used as input values, and the number of neurons 19 is one in the output layer 3 of the trained NN unit 4 and in the output layer 7 of the learning NN unit 8.

The basic control operation by the microcomputer 67 of FIG. 5 will now be described in conjunction with FIG. 7.

As the ignition switch iG is turned on, the microcomputer 67 starts the control operation at a step 300. The program then proceeds to a step 310 where a variety of conversions are effected and flags are initialized.

At a next step 320, the sensor signals from the internal air temperature sensor 61, external air temperature sensor 62, solar radiation sensor 63 and other sensors are input, and the conditions of the operation switches of the panel P such as of temperature setting switch 55 and other switches are also input. The program proceeds to a step 330 where a desired temperature (TAO) of the air blown into the room is calculated depending upon the environmental conditions input at the step 320 in compliance with the following relation 1, $$TAO = K_{SET} \times T_{SET} - K_R \times T_R - K_{AM} \times T_{AM} - K_S \times T_S + C \quad (1)$$

where $K_{SET}$, $K_R$, $K_{AM}$ and $K_S$ are coefficients, G is a constant, $T_{SET}$ is a set temperature, $T_R$ is an internal air temperature, $T_{AM}$ is an external air temperature and $T_S$ is an amount of solar radiation.

The program then proceeds to a step 340 where the opening degree of the air-mixing damper 44 for TAO is calculated, the actuator which is not shown is controlled via the servo motor 44a such that the above opening degree is accomplished to thereby control the temperature of the air blown into the room through the blow ports 13 and 14.

The program then proceeds to a step 350 where the blow rate is calculated, and a fan 42 fixed to a blower motor M is rotated by a drive circuit 42a in order to control the blow rate.

Then, the program proceeds to a step 360 where the ratio of internal air and external air introduced through the internal air/external air switching damper 41 is calculated, and an actuator that is not shown is controlled by the servo motor 41a.

The program proceeds to a step 370 where the condition of the blow port mode is calculated and the blow port switching damper 46 is controlled by the servo motor 46a.

The program then proceeds to step 380 where a compressor that is not shown is turned on or off. When the control of the compressor is finished, the program returns to the step 320 to repeat the above-mentioned processes.

Described below in detail in conjunction with FIGS. 8 to 10 is an embodiment of the present invention dealing with the blower control.

When the air-mixing control is finished at a step 340, the program is shifted to the processing of blower control that is illustrated in detail in a flowchart of FIG. 8.

At a step 3501 in the blower control operation, the turn-off switch 52 of the panel P judges whether the control operation for the air-conditioning device is turned off or not. When the control operation is turned off, the program proceeds to a step 3502.

At the step 3502, OFF processing is carried out stopping the blower motor M and turning off the display that displays the blower control condition, and the program proceeds to the step 360. When it is judged at the step 3501 that the control operation for the air-conditioning device is turned on, the program proceeds to a step 3503 where it is judged whether the blower is automatically controlled or not based on the set condition of the auto switch 51 of the panel P. When the automatic control has been set, the program proceeds to a step 3504.

At the step 3504, basic blower control characteristics (basic characteristics of FIG. 10(A)) stored in the trained NN unit 4 and desired blower control characteristics (desired characteristics of FIG. 10(B)) stored in the learning NN unit 8 through the learning that will be described later, are added up to calculate automatic blower control characteristics (automatic control characteristics of FIG. 10(C)). The blower drive circuit 42a is controlled based upon the above-mentioned characteristics, and the program then proceeds to the step 360.

When it is judged at the step 3503 that the blower is manually controlled, the program proceeds to a step 3505. At the step 3503, the set condition of the blow rate setting switch 57 of the panel P is judged. When, for instance, the set switch of the blow rate M1 is turned on, a blower control signal for realizing the blow rate M1 is output to the blower drive circuit 42a, and manual processing is executed to turn on an indicator 57d to indicate the blow rate M1. The program then proceeds to a step 3506.

The step 3506 judges whether the current manual processing is the initial processing shifted from the automatic control mode. When it is not this initial processing, the program proceeds to the step 360. The program, on the other hand, proceeds to a step 3507 when it is judged that the processing is the initial processing, i.e., the initial one after a passenger has manually set a desired blow rate by using the blow rate setting switch 57 of the panel P upon judging that the automatic control is not suitable.

At the step 3507, the above manually set amount is learned as a correction amount for the basic blower control characteristics, and the automatic learning is executed based on the correction amount to prepare desired characteristics. The program then proceeds to the step 360.

The learning process will now be described in detail with reference to a flowchart of FIG. 9.

Figure 10A:
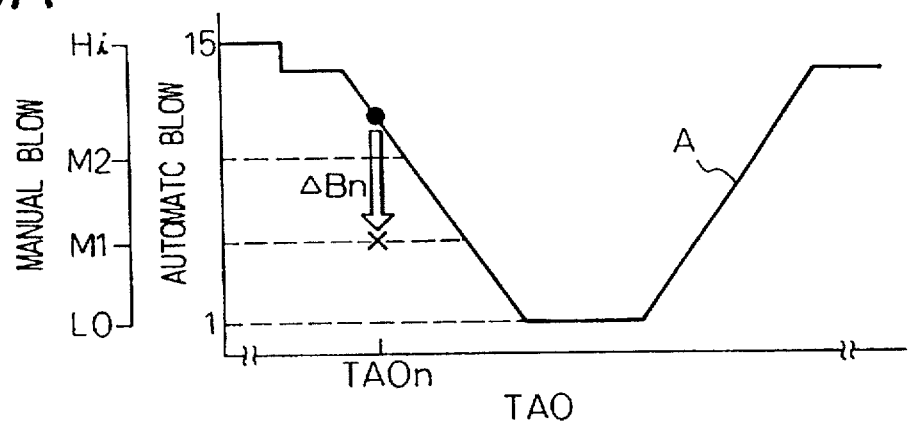
FIG. 10A is a diagram illustrating a basic control pattern of a blower by a learned NN unit.

First, a step 3520 calculates a difference ΔBn (see FIG. 10(A)) between the manually set blow rate accomplished by the blow rate setting switch 57 and the blow rate accomplished by the automatic control of before the manual setting.

Then, a step 3521 checks the state of use of the region which is capable of storing the training data that has been preserved in advance in the storage unit 34. When there is a region capable of storing the training data at this time (blow changing rate ΔBx and TAO value at that moment), the training data are stored at a step 3522.

On the other hand, when the storage region is exceeded, the program proceeds to a step 3523 where a minimum value ΔBmin in the blow changing rates ΔB that were stored thus-far is retrieved. The blow changing rate ΔBmin retrieved at the step 3524 and a blow changing rate ΔBn at this time are compared with each other. When ΔBmin>ΔBn, the program proceeds to a step 3525 where the blow changing rate ΔBn of this time is not stored as training data in the storage unit 34, and the program proceeds to a next step.

On the other hand, when it is judged that ΔBmin<ΔBn, the program proceeds to a step 3526 where the training data of this time is written over the region of learn data having the minimum blow changing rate ΔBmin, and the program proceeds to a step 3527.

Figure 10B:
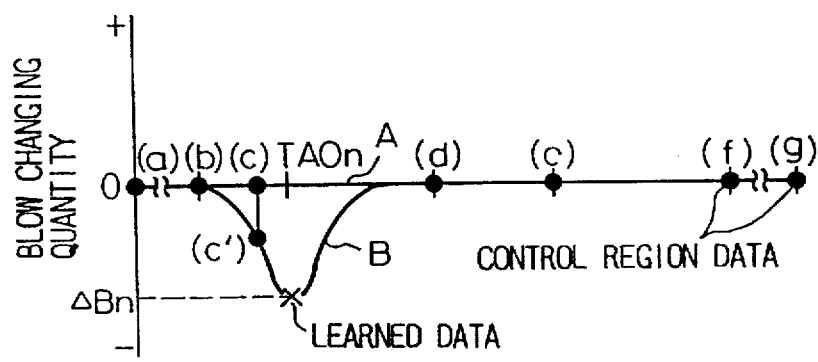
FIG. 10B is a diagram illustrating a control pattern by an additionally learning NN unit.
Figure 10C:
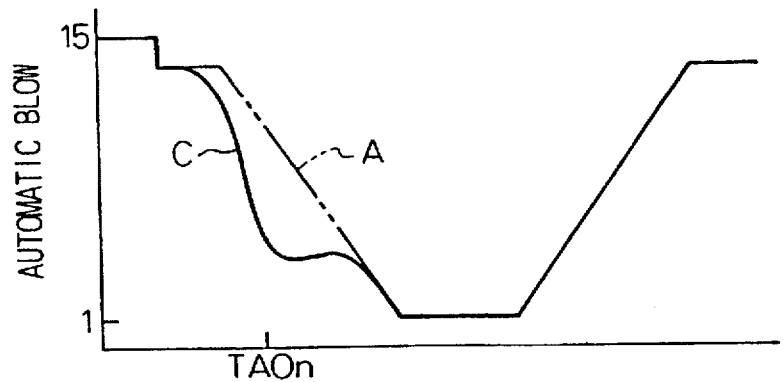
FIG. 10C is a diagram illustrating a control pattern by the sum of the output of the learned NN unit and the output of the learning NN unit.

At the step 3527, the learning is executed according to the known back-propagation method using, as teacher data, the trained data marked with X stored in the storage unit 34 and the control region data marked with (a) to (g) in FIG. 10(B) that are set to correspond to inflection points in the basic control characteristics. Relying upon this back-propagation method, the weights of couplings 21 among the neurons 19 in the learning NN unit 8 are so adjusted that the output of the learning NN unit 8 approaches the teacher data as much as possible and, as a result, desired characteristics are obtained as shown in FIG. 10(B). Under the initial condition, the blow changing rate for the input data has been set to "0". However, the value marked with (c) changes like the data (c') being reflected by the result of learning by the learning NN unit 8. The desired characteristics affect the automatic blower control at the step 3504 after the above-mentioned processing has been finished and, thereafter, the automatic control is executed reflecting a user's preferences.

As described above, the control operation is carried out based on the basic control characteristics which have already been learned so that a majority of persons find it satisfactory on average, a rate of change when the automatic control mode is shifted to the manual control mode by the manual setting switch is regarded to be a quantity desired by the operator, a difference is found between the desired rate and the basic control quantity just before the manual operation, and the pairs of environmental state quantities from the group 30 of environment sensors and the training data are learned by the learning NN unit 8 to automatically form desired control characteristics inclusive of training data. Moreover, the basic control characteristics and the desired control characteristics are added up to calculate automatic control characteristics, in order to control the air-conditioning device.

This constitution makes it possible to reset desired control characteristics only and to facilitate the desired control for many users. During the learning of preferences by the learning NN unit 8, a difference from the basic control characteristics is used making it possible to reduce the capacity of the training data and to shorten the learning time compared with the case of using non-linear characteristics as initial characteristics that are shown in, for example, FIG. 10(A).

Moreover, when the checking indicates that the memory region preserved in advance for training data is exceeded by the capacity of the training data, the training data having large differences from the basic control characteristics are employed as training data, i.e., the data that distinctly indicate preferences are employed as training data. Therefore, the data that distinctly indicate the desired quantity is stored in the finite memory capacity, and the data having a small desired quantity is deleted. Thus, since the memory capacity is effectively utilized, the storage unit having a reduced capacity can be used for storing training data. Moreover, learning of a characteristic desired quantity makes it possible to distinctly express the effect of learning to the user.

Here, the following problem arises when the blow rate control unit is constituted by one neural network in a customary manner to learn the blow rate desired by an individual person.

First, to learn an individual person's preference, the output pattern must be learned for the inputs of all ranges requiring extended periods of time for inputting and learning the data.

Second, when the device is used by an indefinite number of persons, not only a blow pattern desired by an individual person but also an average blow pattern are required.

Third, when the learning does not converge, the output may become indefinite.

With the device being constituted by taking the above-mentioned points into consideration, the individual's preference is obtained as a difference from the average blow rate and is learned by the neural network. Therefore, the data of blow rate that should be changed to meet the individual's preference needs be input and learned, contributing to reducing the amount of the training data. When the vehicle is used by an indefinite number of persons or when the learning does not converge, the neural net that learns the individual's preferred blow rates may be cut off to output an average blow rate.

Though the above-mentioned embodiment dealt with controlling the blower, the present invention can be also adapted to controlling the blow ports and the like.

In the above-mentioned embodiment, the training data were unconditionally stored when the memory has a margin of capacity. It is, however, also allowable to employ judging standards to judge whether the training data sould be employed or not, in order to inhibit the learning of data that are obviously input by mistake.

In the total output unit, the automatic control characteristics were calculated by the processing of addition. This, however, may be effected by other methods.

When the memory is exceeded, the training data having the smallest changing rate were deleted. It is, however, also allowable to select the training data which are the oldest in time, write newly training data thereover thus deleting the old data.

Described below is the learning method where the learning NN unit 8 relies upon the back-propagation method.

The back-propagation method has been proposed for controlling the learning as an algorithm when the learning is effected by a neural network. According to this algorithm, a change in error due to the weight of couplings 21 among the neurons 19 is found, and the weight is updated depending upon the change toward the direction in which the error decreases in order to bring to zero the difference between the output of the neural net and the desired output. A change in error due to the updated weight is found again, and the weight is further updated, such that the error decreases successively.

In this algorithm, the output function of the neurons 19 is represented by a Sigmoid function given by the following equation (2), $$\sigma = 1/(1+e^{-x}) \tag{2}$$

Since the output function of the neurons 19 is given by the Sigmoid function, the output value varies from 0 to 1.

Figure 13:
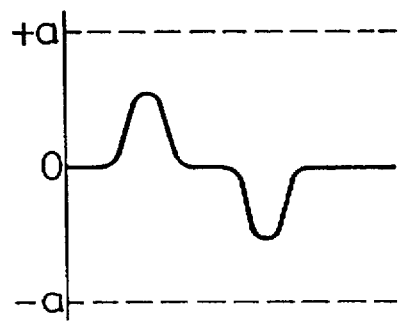
FIG. 13 is a diagram illustrating the control pattern by the learning NN unit.

Here, when the learning NN unit 8 is in the initial condition where the data that represents the individual's preference has not been learned as shown in FIG. 10(b), the blow changing rate is 0'. The flow rate can be changed from the basic blow rate control to be either increased or decreased as shown in FIG. 10(a). Therefore, the desired quantity shown in FIG. 10(b) varies over a range of from −a having a negative sign to +a having a positive sign as shown in FIG. 13.

Furthermore, when the output value of a given state is to be corrected as to produce a desired output value, addition or subtraction will have to be effected for the output value. When such a correction is to be realized with a neural network, the neural network (learning NN unit 8) for effecting the correction must produce outputs of the positive sign and the negative sign.

Figure 14:
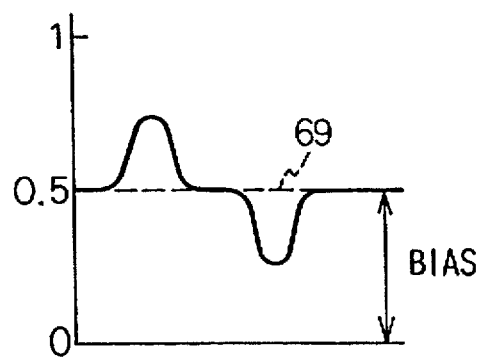
FIG. 14 is a diagram illustrating a control pattern by the learning NN unit of when a bias is applied.

When the Sigmoid function of the above equation (2) is used, the output value varies from 0 to 1. When the values ranging from a positive region to a negative region are to be learned as shown in FIG. 14, the range from −a to +a is standardized within a range of from 0 to 1, and the positive and negative values can be expressed with a given bias plane 69 as a reference. In order to express a bias plane 69 which is a line representing 0.5 in FIG. 14, however, a number of Sigmoid functions must be superposed requiring a number of neurons 19. Difficulty, therefore, is involved to learn and converge such a curved plane.

Figure 15:
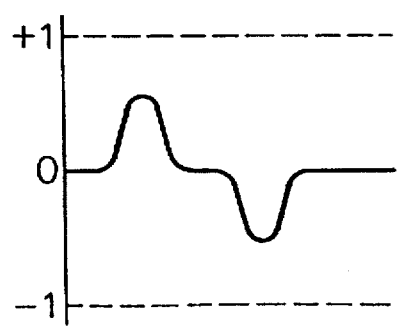
FIG. 15 is a diagram illustrating a control pattern by the learning NN unit.

According to this embodiment, therefore, provision is made for a positive/negative judging unit which judges a positive sign or negative sign of the teacher output, a neural network for producing a positive output and a neural network for producing a negative output. As shown in FIG. 15, therefore, the output ranges from a positive region to a negative region, and the positive output and the negative output are separately learned to improve learning convergence. Moreover, the output range is divided into a range of from −1 to 0 and a range of from 0 to +1 to improve resolution.

Described below with reference to FIGS. 11 to 16 is an embodiment in which the constitution of the above-mentioned neural network is employed for the learning NN unit 8 of the first embodiment.

During the learning as shown in FIG. 11, teacher data consisting of the input signal (teacher input) stored in the first memory 10 and the teacher output stored in the second memory 12 are input to the learning NN unit 8 as in the first embodiment, and the learning is carried out according to the back-propagation method based on the teacher data.

As shown in FIG. 11, the learning NN unit 8 is equipped with a positive/negative judging unit 71 which judges whether the teacher output stored in the second memory 12 has a positive value or a negative value. The teacher output that is judged by the positive/negative judging unit 71 to be a positive teacher output is fed to a neural net unit 81 for positive output (hereinafter referred to as NN unit for positive output). Like the aforementioned neural net units 4 and 8, the NN unit 81 for positive output has neurons 19 which are arranged in a plurality of layers and are electrically coupled together through couplings 21.

The teacher output that is judged by the positive/negative judging unit 71 to be a negative teacher output is converted into an absolute value by an absolute value converter unit 83 that converts a negative value into positive absolute value. The negative teacher output converted into a positive value is learned by he neural net unit 82 for negative output (hereinafter referred to as NN unit for negative output) Like the neural net units 4 and 8, the NN unit 82 negative output has neurons 19 which are arranged a plurality of layers and are electrically coupled together through couplings 21.

Figure 12:
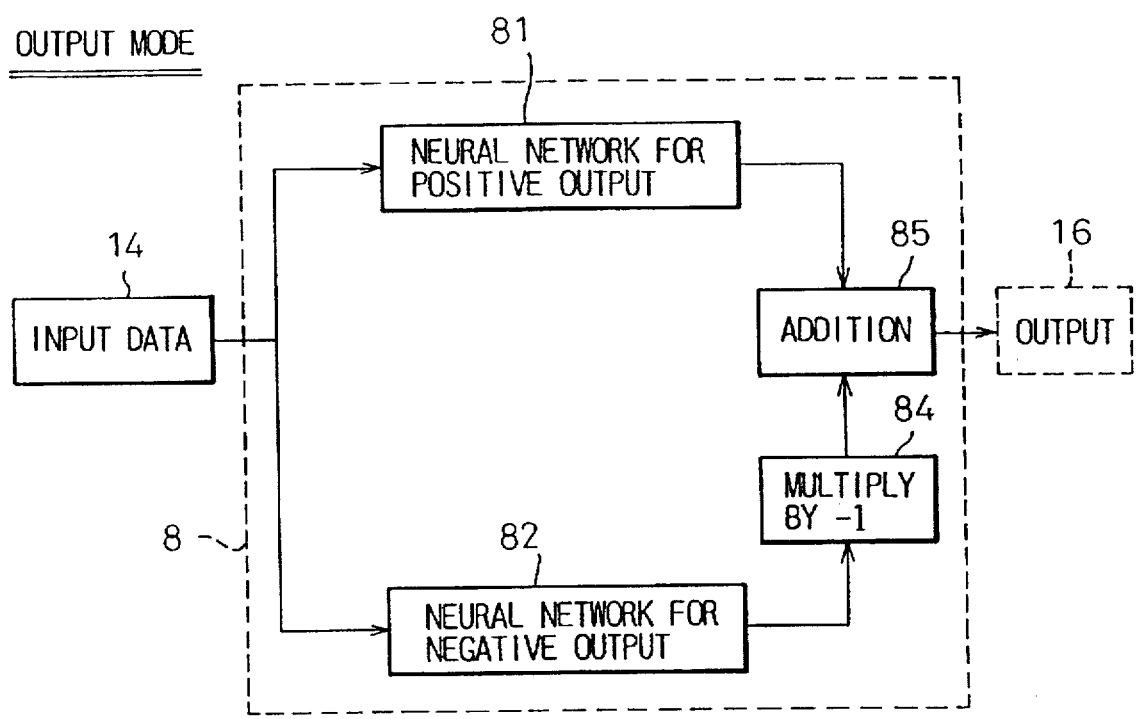
FIG. 12 is a system diagram of the learning NN unit in the output mode.

During the output as shown in FIG. 12, the signals from the signal input unit 14 are fed to the NN unit 81 for positive output and to the NN unit 82 for negative output. The output value of the NN unit 82 for negative output is multiplied by −1 through a unit 84 which negatively converts the output. The output s produced as a negative value since the negative value that is converted into a positive absolute value and is output by the NN unit 82 for negative output is multiplied by −1. The negative output and the positive output are added in an adder means.

The above-mentioned neural network includes a learning mode which effects the learning based on the back-propagation method by giving teacher data and an output mode which out puts a desired value from the neural network that has executed the learning, and which modes can be switched by the switches 9 and 11 shown in FIG. 1.

In the learning mode, the teacher data which consists of teacher input and teacher output includes output data desired by an individual person for a given input and data of which the output becomes 0 for other inputs.

Described below is the operation of the neural network of this embodiment.

First is the learning is discussed. The teacher input stored in the first memory 10 is input to the NN unit 81 for positive output and to the NN unit 82 for negative output. On the other hand, the teacher output stored in the second memory 12 is judged by the positive/negative judging unit 71 in regard to whether it has a positive sign or a negative sign. When the teacher output has a positive sign, the positive teacher output to be learned by the NN unit 81 for positive output is regarded to be equal to the teacher output, and is learned by the NN unit 81 for positive output based upon the back-propagation method. The learning is effected by inputting the output from the NN unit 81 for positive output and the positive teacher output from the positive/negative judging unit 71 until the difference between these outputs is converged within a predetermined range, and whereby the weights of couplings 21 among the neurons 19 are changed. At this moment, the negative teacher output becomes 0. When the present output of the NN unit 82 for negative output is not 0, therefore, the NN unit 82 for negative output learns 0 based on the back-propagation method.

When the teacher output has a negative sign, the positive teacher output becomes 0 due to the positive/negative judging unit 71. When the present output of the NN unit 81 for positive output is not 0, therefore, the NN unit 81 for positive output learns 0. On the other hand, the negative teacher output is regarded to be equal to the teacher output, and the absolute value converter unit 83 produces an absolute value. Based on this value, the NN unit 82 for negative output effects the learning in compliance with the back-propagation method. The learning is effected by inputting the output from the NN unit 82 for negative output and the negative teacher output from the positive/negative judging unit 71 until the difference between these outputs is converged within a predetermined range, and whereby the weights of couplings 21 among the neurons 19 are changed.

As described above, the patterns of all teacher data are learned and, thus, the learning NN unit 8 learns the relationship between inputs and outputs.

Then, by using the switches 9 and 11, the network constitution is switched from the learning mode to the output mode. When an input data is received, the NN unit 81 for positive output produces a predetermined value based on the result of learning. The NN unit 82 for negative output also produces a predetermined value based on the result of learning. Here, however, the output of the NN unit 82 for negative output is multiplied by −1 through the unit 84 which negatively converts the output, and is then added to the output of the NN unit 81 for positive output through the adder unit 85 to form an output of the whole network.

It is thus made possible to constitute a neural network which is capable of learning output values from a positive region up to a negative region and producing the output.

Described below is an example in which the neural network is employed for correcting the amount of fuel injected into an engine.

In order to correct the effects due to aging and differences in the engine itself, the constitution of the invention which effects the learning is employed to set an optimum amount of injection. A difference between the inherent injection amount and an optimum injection amount is learned by the learning NN unit 8. The mode is then switched to the output mode to output a correction amount for obtaining an optimum injection amount.

Figure 16:
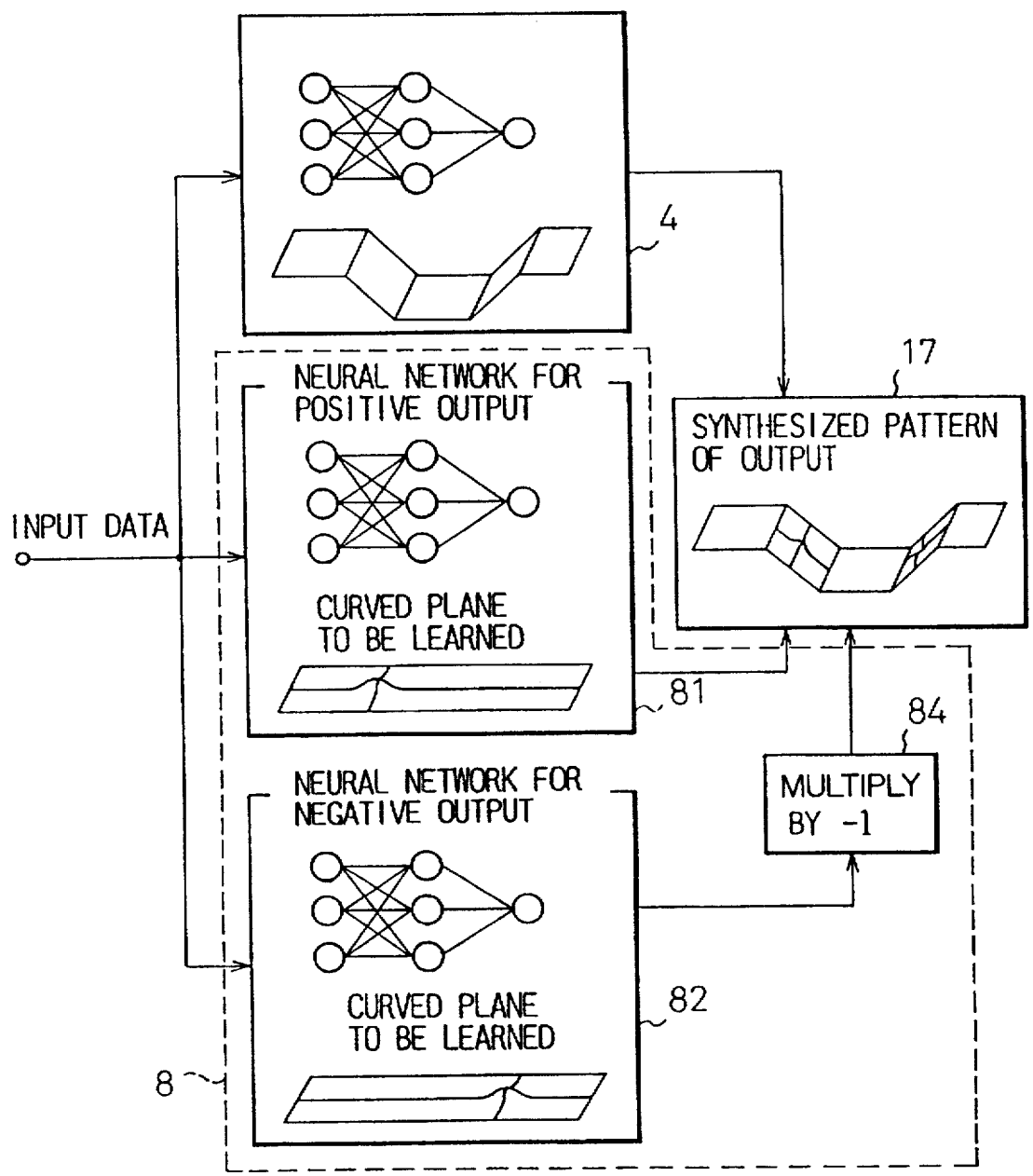
FIG. 16 is a system diagram illustrating a neural net-type learning device of the present invention.

FIG. 16 is a diagram illustrating the overall constitution of the above-mentioned neural network.

As shown in FIG. 16, the neural network of this constitution is equipped with a learned NN unit 4 which outputs an average pattern, an NN unit 81 for positive output and an NN unit 82 for negative output. An input signal is fed to these neural net units 4, 81 and 82 which produce output values. By adding up these output values together, there is obtained a desired output value.

In FIG. 6, there exists one output data that should be additionally learned by the NN unit 81 for positive output and one output data that should be additionally learned by the NN unit 82 for negative output. Multiple data, however, may exist.

With this constitution, only the data of a portion different from the average blow pattern is input to be learned. Moreover, when the device is used by a plurality persons or when the learning does not converge, the NN portion 81 for positive output and the NN portion 82 for negative output are cut off, and the control operation is carried out by the learned NN unit 4 only which produces an average pattern.

In the aforementioned embodiments, the couplings 21 are electrically accomplished. It is, however, also allowable to constitute the device using an optical neural net which is optically coupled.

According to the present invention as described above, a learning neural net unit capable of executing additional learning is provided separately from the basic control unit which performs the basic control operation. The learning neural net unit additionally learns the control data for outputting a value of change only when the output value is changed.

Since the additional data corresponding to the change only are additionally learned by the learning neural net portion, the additional control pattern that complies with the additionally learned data can also be learned. Any desired output value can be obtained by adding the additional output value of the learning neural net unit to the basic output value of the basic control unit.

The learned neural net unit based upon the basic control pattern does not repeat the learning and does not affect portions other than the input-output relationships that are to be changed.

Even in the second aspect of the present invention, after the storage unit has stored the additionally learned data up to its full capacity, unnecessary data in the additionally learned data stored in the storage unit are compared with new additionally learned data, and data which are more important are stored. Therefore, additionally learned data which are more important are stored in the storage unit, which has a limited capacity.

According to the third aspect of the present invention, the additional control pattern learned by the learning neural net unit is learned by being separated into the case of a positive output value and the case of a negative output value. The data having a negative output value is learned after having been converted into an absolute value and can hence be learned in the same manner as the data having a positive value. To obtain an output of the learning neural net unit, a negative output value is multiplied by −1 to obtain a sum thereof with a positive output value. Even when there is a negative output value, therefore, the learning can be easily converged and the time for processing the learning is shortened.

We claim:

1. A neural network learning device comprising:

signal input means for providing input signals;

a basic control unit, connected to said signal input means, which has previously learned a basic control pattern and which generates basic output values based on the basic control pattern when said input signals are provided by said signal input means;

a learning neural network unit that receives said input signals from said signal input means, said learning neural network generating additional output values in response to said input signals based on an additional control pattern;

a total output unit for generating total output values based on a sum of said basic output values and said additional output values;

output changing means for changing at least one of said total output values;

difference calculation means for calculating a difference between said changed total output values and said basic output values;

a storage unit for storing additional learning data, said additional learning data including said differences calculated by said difference calculation means and said input signals, said learning neural network being trained on said additional learning data, and said additional control pattern being based on said additional learning data;

comparator means for comparing a capacity of a storage region of said storage unit with an amount of additional learning data when said total output values are changed by said output changing means;

selection means for selecting stored data from within said storage means when said comparator means determines that said amount of additional learning data exceeds said storage region capacity, said stored data being selected based on criteria including at least one of an amount of time stored and a deviation from said changed output values;

judging means for comparing said selected stored data with said additional learning data, and for determining whether said additional learning data will be stored based on said criteria; and stored data control means for writing said additional learning data in said storage means when said judging means determines that said additional learning data will be stored.

2. A device according to claim 1, wherein said signal input means includes at least one environmental sensor for generating input signals based on data related to environmental conditions and said output changing means includes a touch panel that is manipulated by a passenger of said vehicle, said device further comprising:

additional storage means for storing said data related to environmental conditions, said basic output values, and said changed total output values, wherein said additional learning data also includes said data related to environmental conditions so that said learning neural network is also trained based on said data related to environmental conditions, and wherein said additional storage means stores said data when said touch panel is manipulated while said air-conditioning device is controlled by said basic output values in a predetermined manner under predetermined environmental conditions, and when said air-conditioning device is supplied with input signals that place said air-conditioning device in a condition different from a condition in which it is controlled by said basic control unit.

3. A device as recited in claim 1, wherein said device is employed as a control means for controlling an air-conditioning device for a vehicle.

4. A device as recited in claim 3, wherein said air-conditioning device has an air duct within which is provided at least an internal air/external air switching damper, a blower, an evaporator, an air-mixing damper, a heater core and a blow port switching damper, said control means controlling at least one of said internal air/external air switching damper, blower, evaporator, air-mixing damper, heater core or blow port switching damper in response to an input signal from said input signal means.

5. A device as recited in claim 4, wherein said input signal means includes at least one environmental sensor for generating input signals based on data related to environmental conditions, and wherein said basic control unit constitutes a neural network unit that is previously trained on said data related to environmental conditions and basic control characteristics of said air-conditioning device under said environmental conditions, said basic control unit generating said basic control values for controlling said air-conditioning device in response to at least one of said input signals generated by said environmental sensors.

6. A device as recited in claim 3, wherein said input signal means has a plurality of input signal terminals, and said basic control unit produces one or more of said basic output values.

7. A device as recited in claim 3, wherein said signal input means includes at least one environmental sensor for generating input signals based on data related to environmental conditions and said output changing means includes a touch panel that is manipulated by a passenger of said vehicle, said device further including:

suitable storage means for storing said data related to environmental conditions, basic output values, and said changed total output values, wherein said additional learning data also includes said data related to environmental conditions so that said learning neural network is also trained based on said data related to environmental conditions, and wherein said suitable storage means stores said data when said touch panel is manipulated while said air-conditioning device is controlled by said basic output values in a predetermined manner under predetermined environmental conditions, and when said input signals supplied to said air-conditioning device place said air-conditioning device in a condition different from a condition in which it is controlled by said basic control unit.

8. A device as recited in claim 7, wherein said learning neural network unit is disconnected from the basic control unit while being trained on said additional learning data.

9. A device as recited in claim 1, wherein said signal input means includes at least one of an internal air temperature sensor, an external air temperature sensor, a solar radiation sensor, an outlet port temperature sensor and a water temperature sensor that constitutes an environment sensor.

10. A device as recited in claim 1, wherein said output changing means is a touch panel that can be manipulated by a passenger of a vehicle.

11. A neural network learning device comprising:

signal input means for providing input signals;

a basic control unit, connected to said signal input means, which has previously learned a basic control pattern and which generates basic output values based on the basic control pattern when said input signals are provided by said signal input means;

a learning neural network unit that receives said input signals from said signal input means, said learning neural network generating additional output values in response to said input signals based on an additional control pattern;

a total output unit for generating total output values based on a sum of said basic output values and said additional output values;

output changing means for changing at least one of said total output values;

difference calculation means for calculating a difference between said changed total output values and said basic output values;

a storage unit for storing additional learning data, said additional learning data including said differences calculated by said difference calculation means and said input signals, said learning neural network being trained on said additional learning data, and said additional control pattern being based on said additional learning data;

judging means for determining whether said differences calculated by said difference calculation means have positive values or negative values; and absolute value conversion means for calculating absolute values of said differences when said differences are determined to have negative values;

wherein said learning neural network unit comprises:

a first neural network unit for generating positive additional output values based on a positive-side additional control pattern when input signals are provided by said signal input means;

a second neural network unit for generating negative additional output values based on a negative-side additional control pattern when input signals are input from said signal input means;

output conversion means for generating converted negative additional output values by multiplying said negative additional output values generated by said second neural network unit by −1; and an output unit which generates an output based on a sum of said positive additional output values and said converted negative additional output values, wherein said first neural network unit learns said positive-side additional control pattern based on said differences calculated by said difference calculation means when said differences have positive values, and wherein said second neural network unit learns said negative-side additional control pattern based on said differences calculated by said difference calculation means when said differences have negative values.

12. A neural network learning device for controlling an air-conditioning device for a vehicle, comprising:

signal input means for providing input signals, said signal input means including at least one environmental sensor for generating input signals based on data related to environmental conditions;

a basic control unit connected to said signal input means which has previously learned a basic control pattern and which generates basic output values based on the basic control pattern when said input signals are provided by said signal input means;

a learning neural network unit that receives said input signals from said signal input means, said learning neural network generating additional output values in response to said input signals based on an additional control pattern;

a total output unit for generating total output values based on a sum of said basic output values and said additional output values;

output changing means for changing at least one of said total output values, said output changing means including a touch panel that is manipulated by a passenger of said vehicle;

a difference calculation means for calculating a difference between said changed total output values and said basic output values;

a storage unit for storing additional learning data, said additional learning data including said differences calculated by said difference calculation means and said input signals, said learning neural network being trained on said additional learning data, and said additional control pattern being based on said additional learning data;

a suitable storage means for storing said data related to environmental conditions, basic output values, and said changed total output values, wherein said additional learning data also includes said data related to environmental conditions so that said learning neural network is also trained based on said data related to environmental conditions, and wherein said suitable storage means stores said data when said touch panel is manipulated while said air-conditioning device is controlled by said basic output values in a predetermined manner under predetermined environmental conditions, and when said air-conditioning device is supplied with input signals that place said air-conditioning device in a condition different from a condition in which it is controlled by said basic control unit;

selecting means for selecting additional learning data stored within said storage means that have a smallest associated control level;

judging means for comparing said selected additional learning data with said additional learning data to be stored based on respectively associated control levels; and stored data control means for writing said additional learning data to be stored in said storage means when said additional learning data to be stored have smaller associated control levels than said selected additional learning data within said storage means.

* * * * *